(12) United States Patent
Miegel

(10) Patent No.: US 7,831,264 B2
(45) Date of Patent: Nov. 9, 2010

(54) TRACKING A GROUP OF MOBILE TERMINALS

(75) Inventor: Magnus Miegel, Horby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 381 days.

(21) Appl. No.: 11/551,911

(22) Filed: Oct. 23, 2006

(65) Prior Publication Data
US 2008/0096519 A1 Apr. 24, 2008

(51) Int. Cl.
H04W 24/00 (2009.01)
H04M 11/04 (2006.01)
H04B 7/00 (2006.01)
G08B 1/08 (2006.01)

(52) U.S. Cl. .................. 455/457; 455/404.2; 455/456.1; 455/456.6; 455/518; 340/539.1; 340/539.13

(58) Field of Classification Search .............. 455/404.2, 455/456.1, 456.6, 457, 404.1, 456.2, 456.3, 455/456.4, 456.5, 518; 370/328; 340/426.2, 340/426.18, 426.19, 539.1, 539.13, 825.36, 340/825.49
See application file for complete search history.

(56) References Cited

U.S. PATENT DOCUMENTS

| | | | |
|---|---|---|---|
| 6,762,678 B2 * | 7/2004 | Arens | 340/506 |
| 6,871,144 B1 | 3/2005 | Lee | |
| 6,975,873 B1 * | 12/2005 | Banks et al. | 455/456.5 |
| 7,053,780 B1 * | 5/2006 | Straub et al. | 340/601 |
| 7,400,892 B1 * | 7/2008 | Banks et al. | 455/456.5 |
| 7,502,687 B2 * | 3/2009 | Flick | 701/213 |
| 7,741,968 B1 * | 6/2010 | Tannenbaum et al. | 340/539.13 |
| 2002/0198659 A1 | 12/2002 | Doyle et al. | |
| 2003/0100326 A1 * | 5/2003 | Grube et al. | 455/515 |
| 2004/0183674 A1 * | 9/2004 | Ruvarac | 340/539.13 |
| 2005/0062604 A1 * | 3/2005 | Fong et al. | 340/539.23 |
| 2005/0143096 A1 * | 6/2005 | Boesch | 455/456.3 |
| 2005/0157689 A1 * | 7/2005 | Schnurr | 370/338 |
| 2006/0099969 A1 * | 5/2006 | Staton et al. | 455/456.4 |
| 2006/0223518 A1 * | 10/2006 | Haney | 455/420 |
| 2007/0276596 A1 * | 11/2007 | Solomon et al. | 701/211 |
| 2008/0155689 A1 * | 6/2008 | Denninghoff et al. | 726/22 |

FOREIGN PATENT DOCUMENTS

| | | |
|---|---|---|
| EP | 1243941 A1 | 9/2002 |
| WO | WO 99/51048 | 10/1999 |
| WO | WO 03/053080 A1 | 6/2003 |

(Continued)

OTHER PUBLICATIONS

PCT International Search Report with Written Opinion for corresponding PCT Application No. PCT/IB2007/051485, mailed Oct. 18, 2007, 25 pages.

(Continued)

Primary Examiner—George Eng
Assistant Examiner—Bryan Pitt
(74) Attorney, Agent, or Firm—Harrity & Harrity, LLP

(57) ABSTRACT

A method performed by a mobile terminal may include setting a tracking parameter for a group of mobile terminals, transmitting text and position information messages of each of the mobile terminals, and displaying the messages based on priority. The method may further include automatically generating messages relating to the position of a mobile terminal.

10 Claims, 9 Drawing Sheets

FOREIGN PATENT DOCUMENTS

WO    WO 2004/059996 A1    7/2004

OTHER PUBLICATIONS

PCT Invitation to Pay Additional Fees /Partial International Search Report, PCT/IB2007/051485, Sep. 10, 2007, 8 pages.

Written Opinion of the International Preliminary Examining Authority issued for corresponding international application No. PCT/IB2007/051485, mailed Dec. 4, 2008, 12 pages.

* cited by examiner

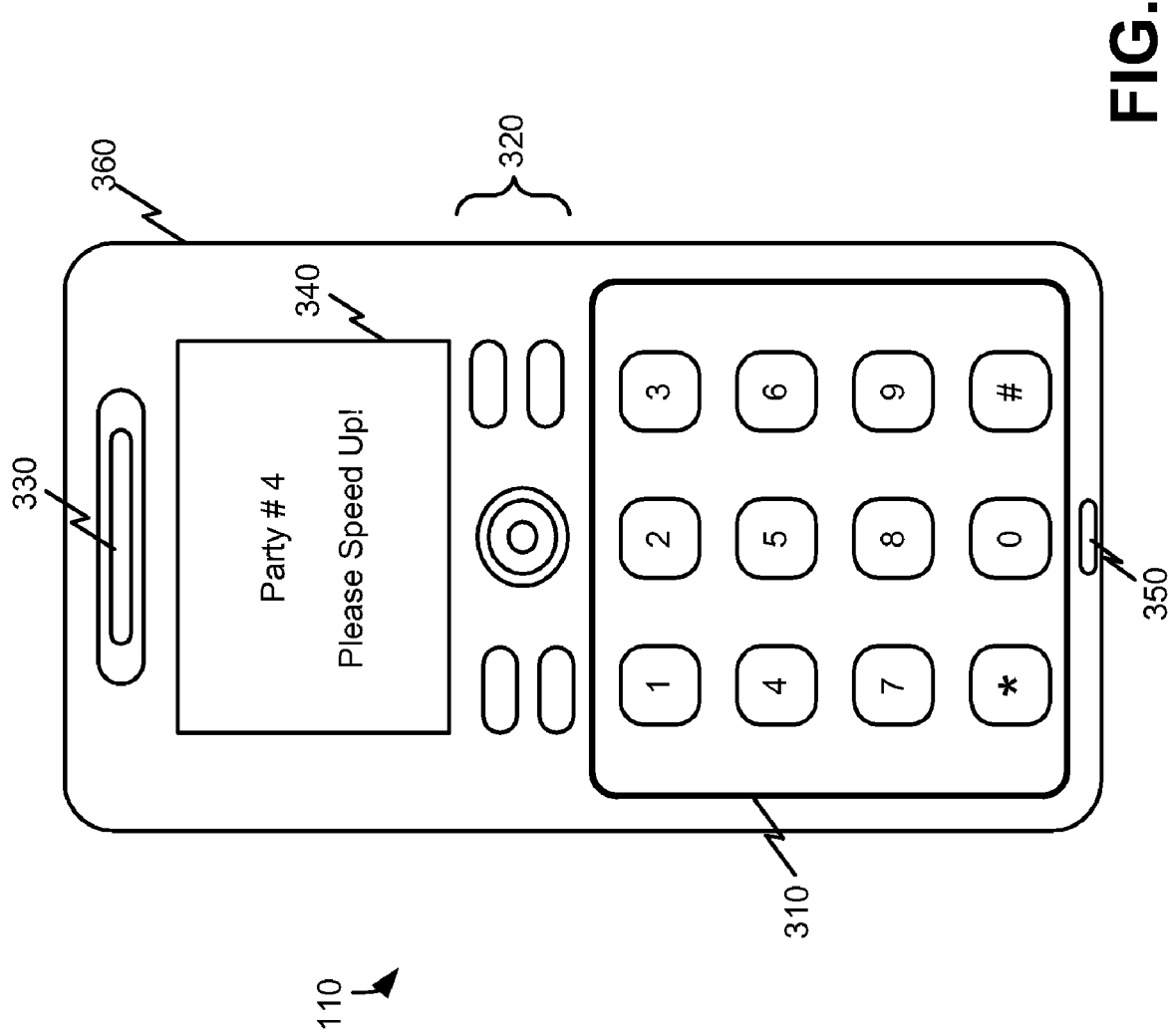

TRACKING A GROUP OF MOBILE TERMINALS

TECHNICAL FIELD OF THE INVENTION

The systems and methods described herein generally relate to communications devices and, more particularly, to tracking the position of communications devices.

DESCRIPTION OF RELATED ART

Communication devices, such as cellular telephones, have become increasingly versatile. For example, cellular telephones often include Global Positioning System (GPS) tracking features that enable users to monitor their position. At the present time, GPS features employed on cellular telephones and portable communications devices are limited to tracking a position of the device itself.

SUMMARY

According to one aspect, a method comprises setting at least one tracking parameter for a plurality of mobile terminals, receiving position information from each of the plurality of mobile terminals, and automatically displaying a message on at least one of the plurality of mobile terminals based on the at least one tracking parameter and a position of the at least one mobile terminal.

Additionally, the at least one tracking parameter includes at least one of a distance or an area.

Additionally, the at least one mobile terminal comprises a first mobile terminal, the method further comprising generating the message when the position of the first mobile terminal has exceeded the at least one tracking parameter.

Additionally, the automatically displayed message on the at least one of the mobile terminals comprises text indicating at least one of a position alert, a speed alert, an acceleration alert or a heading alert.

Additionally, the setting the at least one tracking parameter for a plurality of mobile terminals comprises: designating a leader mobile terminal, wherein the leader mobile terminal sends prioritized messages to the plurality of mobile terminals.

According to another aspect, a mobile terminal is provided. The mobile terminal comprises: a memory for storing tracking information; a display; and logic configured to: receive position messages relating to a position of each of a plurality of mobile terminals; and control the display to display the position of each of the plurality of mobile terminals based on the received position messages from each of the plurality of mobile terminals.

Additionally, the logic may be configured to compare the position of the mobile terminals to the stored tracking information.

Additionally, the logic is further configured to control the display to display a text message relating to the position of the mobile terminal based on the comparing the position of the mobile terminal to the stored tracking information.

Additionally, the logic is further configured to receive text messages from the plurality of mobile terminals; determine a priority level associated with the received position messages and text messages; and display received messages based on the determined priority level.

Additionally, the received message with a highest determined priority level corresponds to an emergency message.

According to another aspect, a method is provided. The method comprises: receiving position messages relating to position information of each of a plurality of mobile terminals; receiving text messages from at least one of the plurality of mobile terminals; determining a priority level for each of the position and text messages; and displaying a received message with a highest determined priority level.

Additionally, the method further comprises storing a message priority level associated with a plurality of message types.

Additionally, the plurality of message types comprise: emergency text messages, position alert text messages, leader text messages, text messages and position messages.

Additionally, the method further comprises setting tracking parameters relating to positions of the plurality of mobile terminals.

Additionally, the method further comprises automatically generating a text message based on comparing a position of one of the mobile terminals to the tracking parameters.

According to another aspect, a mobile terminal is provided. The mobile terminal comprises a memory configured to store message priority levels associated with a plurality of message types; a display; and logic configured to: receive a position message relating to a position of a second mobile terminal; receive a text message from a third mobile terminal; determine a priority level of the received text message and the received position message; and control the display to display one of the received messages based on the determined priority level associated with the received position message and the received text message.

Additionally, a received text message relating to an emergency corresponds to a highest priority level message.

Additionally, the memory is further configured to store tracking parameters relating to the position of a plurality of mobile terminals.

Additionally, the logic is further configured to: compare a position of the mobile terminal to the stored tracking parameters.

Additionally, the logic is further configured to: automatically generate a text message based on the comparing a position of the mobile terminal to the stored tracking parameters.

Other features and advantages of the systems and methods described herein will become readily apparent to those skilled in this art from the following detailed description. The implementations shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIGS. 6A-6D illustrate exemplary displays on a mobile terminal.

DETAILED DESCRIPTION

The following detailed description refers to the accompanying drawings. The same reference numbers in different drawings identify the same or similar elements. Also, the following detailed description does not limit the systems and methods described herein. Instead, the scope of the systems and methods are defined by the appended claims and their equivalents.

Figure 1:
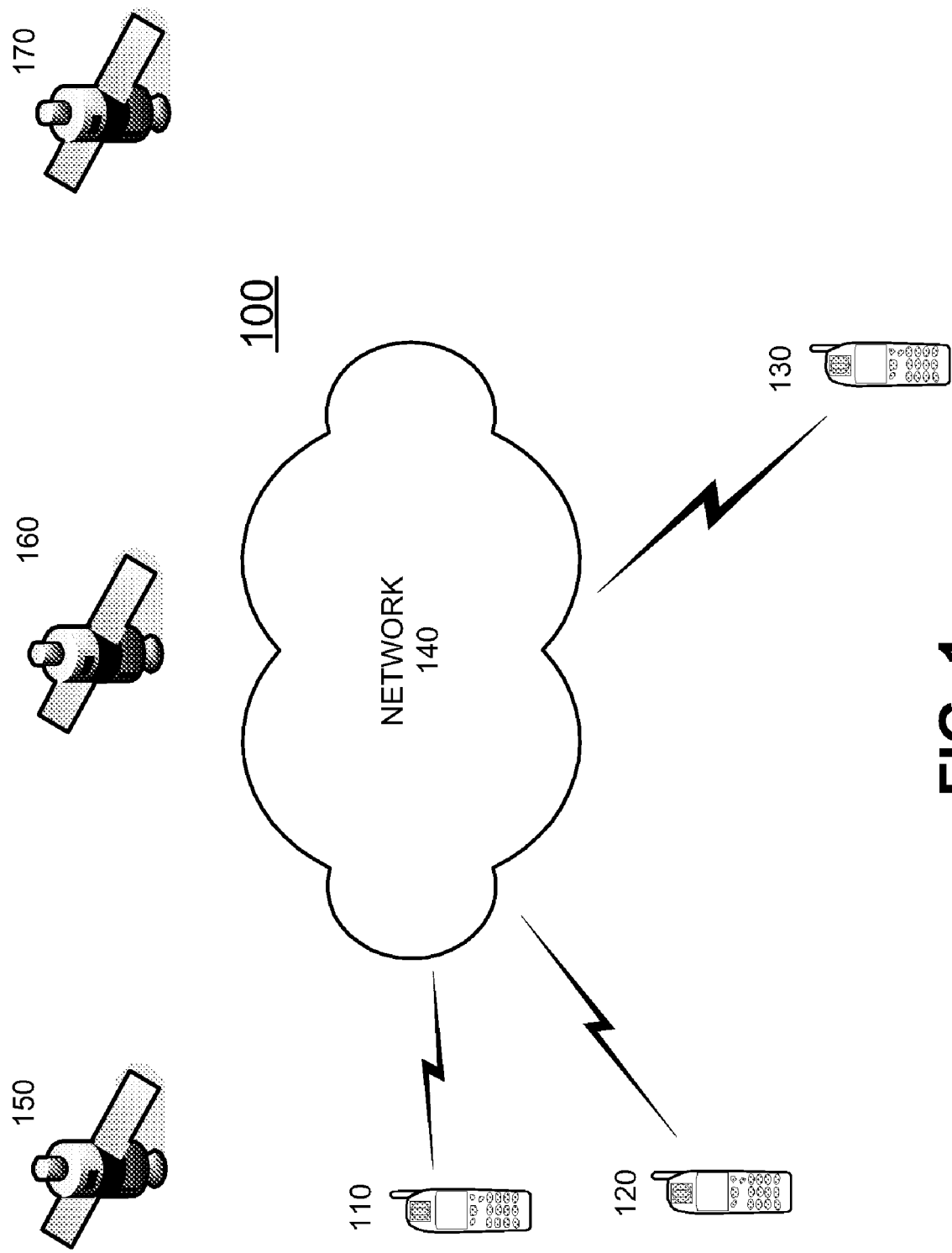
FIG. 1 is a diagram of an exemplary system in which methods and systems described herein may be implemented.

FIG. 1 is a diagram of an exemplary system 100 in which methods and systems described herein may be implemented. System 100 may include mobile terminals 110, 120 and 130, network 140 and GPS satellites 150, 160 and 170. It should be understood that system 100 may include other numbers of mobile terminals and GPS satellites. For example, system 100 may include a number of base stations and base station antennas used to transmit information between mobile terminals 110-130.

The methods and systems described herein may be implemented in the context of a mobile terminal. As used herein, the term "mobile terminal" may include a cellular radiotelephone with a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a radio (AM/FM) receiver; and a laptop and/or palmtop receiver or other appliance that includes a radiotelephone transceiver. Mobile terminals may also be referred to as "pervasive computing" devices that are capable of communicating with other devices via Short Messaging Service (SMS) protocols or other protocols that allow for simultaneous communications of voice, data, music and video information.

Network 140 may include one or more networks including a cellular network, a satellite network, the Internet, a telephone network, such as the Public Switched Telephone Network (PSTN), a metropolitan area network (MAN), a wide area network (WAN), or a local area network (LAN). Mobile terminals 110, 120 and 130 may communicate with each other over network 140 via wired, wireless or optical connections.

In an exemplary implementation, network 140 includes a cellular network used for transmitting data and messages between mobile terminals 110-130. For example, components of a cellular network may include base station antennas (not shown) that transmit and receive data from mobile terminals within their vicinity. Other components of a cellular network, for example, may also include base stations (not shown) that connect to the base station antennas and communicate with other devices, such as switches and routers (not shown) in accordance with known techniques.

GPS satellites 150, 160 and 170 may include a communication interface that may include any transceiver-like mechanism and one or more processors or microprocessors enabled by software programs and/or hardware to perform functions, such as transmission of GPS signals. GPS signals transmitted by GPS satellites 150-170 may be received by mobile terminals 110-130, and may be used to calculate the position of each mobile terminal 110-130, for example.

Figure 2:
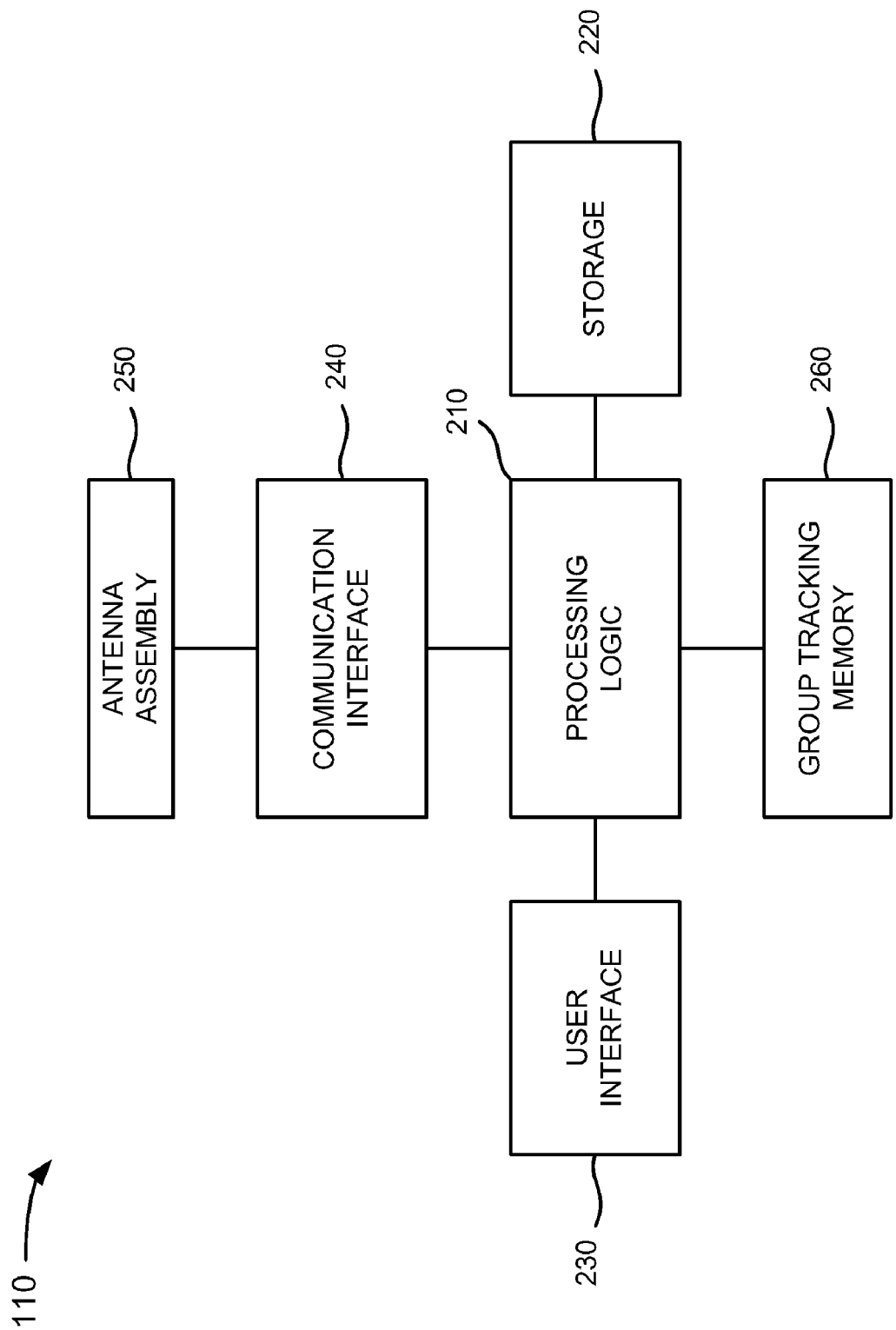
FIG. 2 is a diagram of an exemplary mobile terminal of FIG. 1.

FIG. 2 is a diagram of exemplary components of mobile terminal 110. As shown in FIG. 2, mobile terminal 110 may include processing logic 210, storage 220, user interface 230, communication interface 240, and antenna assembly 250, and group tracking memory 260. Processing logic 210 may include a processor, microprocessor, an application specific integrated circuit (ASIC), field programmable gate array (FPGA), or the like. Processing logic 210 may include data structures or software programs to control operation of mobile terminal 110 and its components. Storage 220 may include a random access memory (RAM), a read only memory (ROM), and/or another type of memory to store data and instructions that may be used by processing logic 210.

User interface 230 may include mechanisms for inputting information to mobile terminal 110 and/or for outputting information from mobile terminal 110. Examples of input and output mechanisms might include a speaker to receive electrical signals and output audio signals, a microphone to receive audio signals and output electrical signals, control buttons and/or keys on a keypad to permit data and control commands to be input into mobile terminal 110, and a display to output visual information. These exemplary types of input and output mechanisms contained in user interface 230 are shown and described in greater detail in FIG. 3.

Communication interface 240 may include, for example, a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and reception of the RF signals. Communication interface 240 may also be configured to receive and process GPS signals from GPS satellites 150-170, for example. Antenna assembly 250 may include one or more antennas to transmit and receive RF signals and GPS signals over the air. Antenna assembly 250 may receive RF signals from communication interface 240 and transmit them over the air and receive RF signals over the air and provide them to communication interface 240.

Group tracking memory 260 may contain information relating to tracking parameters that may define position limits relating to distances or areas between mobile terminals 110-130. Group tracking memory 260 may also store information relating to identifying mobile terminals in a group and may store information regarding waypoints or a group itinerary, for example. Group tracking memory 260 may also store tracking parameters relating to velocities and accelerations of mobile terminals 110-130. Group tracking memory 260 may also store priority levels of messages that may be transmitted and received by mobile terminal 110. These priority levels stored in group tracking memory 260 may be used by processing logic 210 to provide a prioritized display of messages on mobile terminal 110, for example.

As will be described in detail below, mobile terminal 110 may perform operations in response to processing logic 210 executing software instructions to calculate, display, and transmit/receive position signals to/from a group of mobile terminals, using an application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with the embodiments. Thus, implementations consistent with the principles of the embodiments are not limited to any specific combination of hardware circuitry and software.

Figure 3:
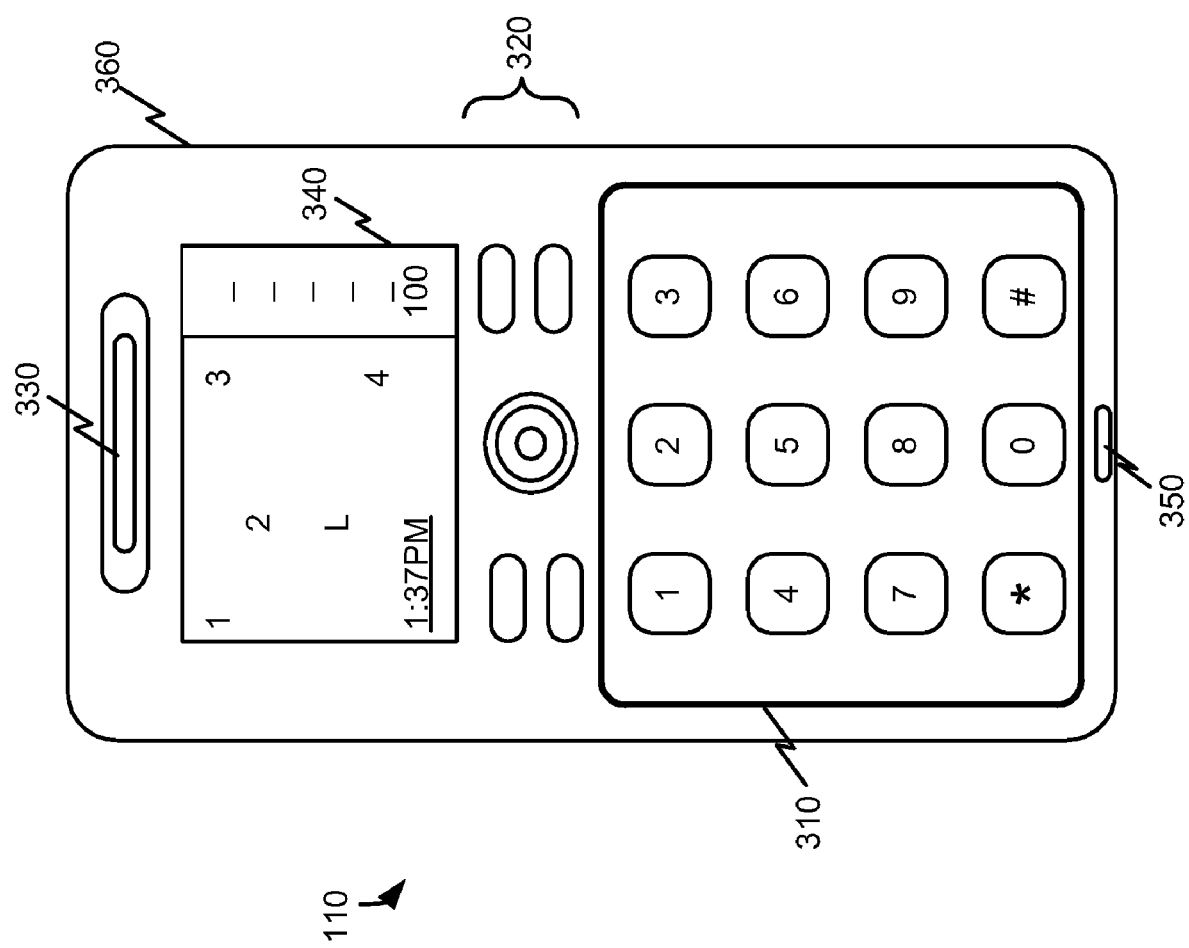
FIG. 3 shows an exemplary mobile terminal.

FIG. 3 shows an exemplary mobile terminal 110 that may include housing 360, keypad 310, control keys 320, speaker 330, display 340, and microphone 350. Housing 360 may include a structure configured to hold devices and components used in mobile terminal 110. For example, housing 360 may be formed from plastic, metal, or composite and may be configured to support keypad 310, control keys 320, speaker 330, display 340 and microphone 350.

Keypad 310 may include devices and/or logic that can be used to operate mobile terminal 110. Keypad 310 may further be adapted to receive user inputs, directly or via other devices, such as a stylus for entering information into mobile terminal 110. In one implementation, communication functions of mobile terminal 110 may be controlled by activating keys in keypad 310. Implementations of keys may have key information associated therewith, such as numbers, letters, symbols, etc. The user may operate keys in keypad 310 to place calls, enter digits, commands, and text messages into mobile terminal 110. Designated functions of keys may form and/or manipulate images that may be displayed on display 340.

Control keys 320 may include buttons that permit a user to interact with mobile terminal 110 to perform specified actions, such as to interact with display 340, etc. For example, a user may use control keys 320 to select from a menu of choices for example, that may include selecting a choice to send or receive text messages to another mobile terminal 120-130.

Speaker 330 may include a device that provides audible information to a user of mobile terminal 110. Speaker 330 may be located anywhere on mobile terminal 110 and may function, for example, as an earpiece when a user communicates using mobile terminal 110. Speaker 330 may also function as an output device for a playing music, or generating an alarm tone in an emergency, for example.

Display 340 may include a device that provides visual images to a user. For example, display 340 may display text to a user. Display 340 may also display graphic information regarding incoming/outgoing calls, text messages, phonebooks, volume settings, etc., to a user of mobile terminal 110. Implementations of display 340 may be implemented as black and white or color displays, such as a liquid crystal display (LCD). Display 340 may show a position of each mobile terminal in a group. For example, each of 4 mobile terminals in a group of 5 mobile terminals may be represented by a number (1-4) and a "Leader" mobile terminal in the group may be represented by an "L" on display 340, as illustrated in FIG. 3. The display 340 may also include a distance scale, the current date/time and may also display text messages, as described below with respect to FIGS. 6A-6D, for example. For example, display 340 shows mobile terminals 1 and 3 located at the lead, followed by mobile terminal 2, the leader and mobile terminal 4. This allows each of the parties to quickly determine their relative position in the group and their current heading.

Microphone 350 may include a device that converts speech or other acoustic signals into electrical signals for use by mobile terminal 110. Microphone 350 may be located anywhere on mobile terminal 110 and may be configured, for example, to convert spoken words or phrases into electrical signals for use by mobile terminal 110.

Figure 4:
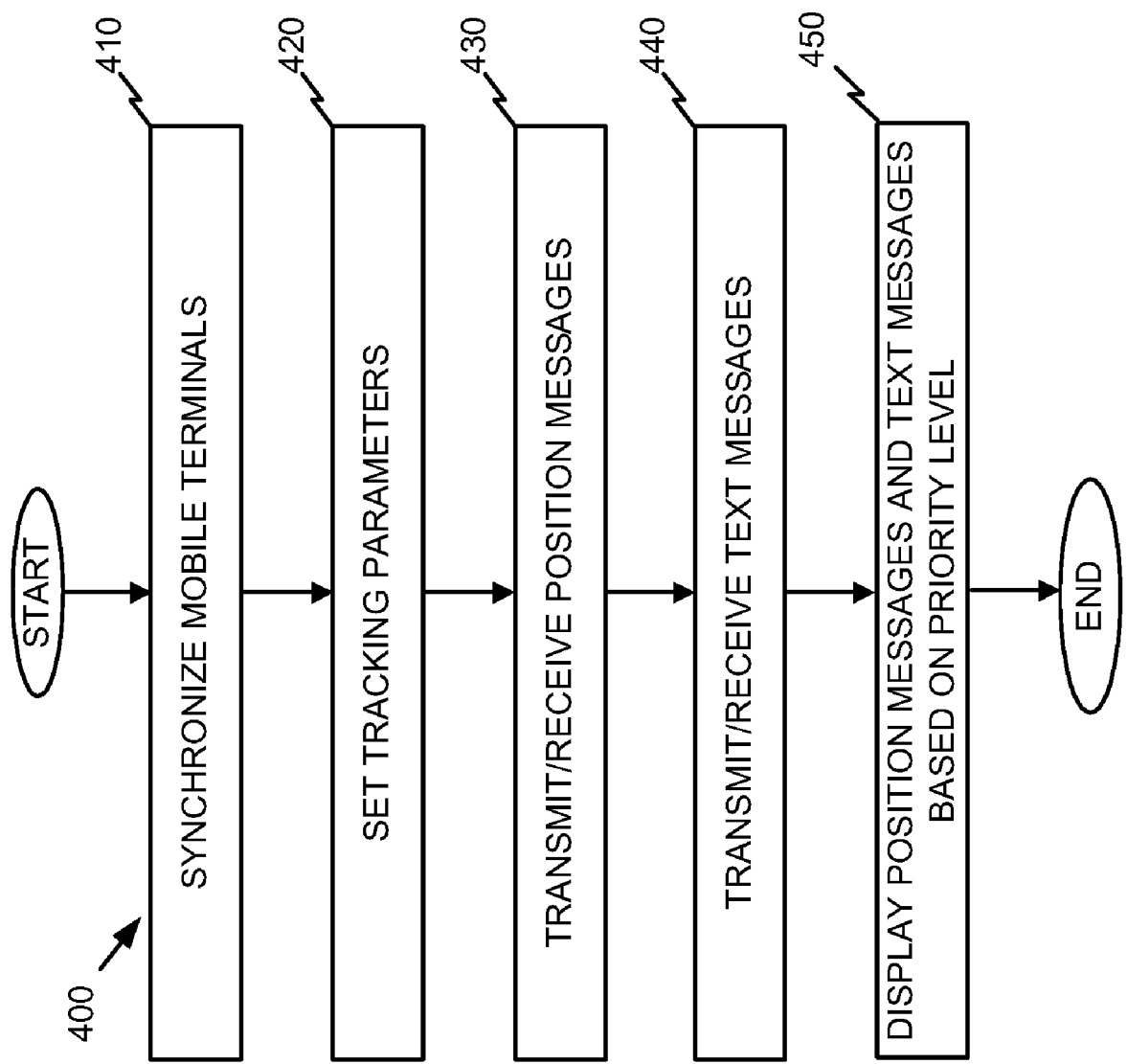
FIG. 4 is a flow diagram illustrating exemplary processing by a mobile terminal.

FIG. 4 illustrates an exemplary processing 400 performed by mobile terminal 110. Processing may begin for example, when mobile terminal 110 powers up and synchronizes position and time parameters (act 410). For example, mobile terminal 110 may begin to receive transmissions from GPS satellites 150-170 in order to synchronize position and time parameters. If for example, a group of 3 people (each having one of mobile terminals 110-130) plan to travel together, each mobile terminal 110-130 may calculate and synchronize their respective position and time parameters (act 410). It should be understood that additional parties may be included in the group. For example, parties associated with 2 other mobile terminals may be included in this example.

Once mobile terminals 110-130 have been synchronized, tracking parameters may be set (act 420). For example, using keys on keypad 310, a user of mobile terminal 110 may enter parameters that relate to identification of mobile terminals in a group and tracking parameters that may be used to track the group of mobile terminals. A tracking parameter may be a distance indicating that two mobile terminals are too close together, or may be a distance that two mobile terminals are too far apart, for example. Other examples of tracking parameters may be a "gravity" constant used to keep a group together, an area, a velocity, an acceleration, or a distance from a designated leader mobile terminal, for example. Further examples of tracking parameters may include a group itinerary of places to visit, for example, coordinates, or information that mobile terminals should be at the museum at 2 PM.

For example, if the users' of mobile terminals 110-130 plan to go on a hike, a tracking parameter of 100 meters may be entered into mobile terminal 110 (act 420). If for example, the user's of mobile terminals 110-130 plan to drive across country, a tracking parameter entered in act 420 may be 10 miles. The tracking parameter entered in act 420 may be used to alert any of the mobile terminals 110-130 that they may be too far apart, or too close to one another, and an appropriate message may be generated and displayed as described below. Also for example, a maximum value of mobile terminal's velocity or acceleration may be set as a tracking parameter (act 420). Another exemplary tracking parameter entered in act 420 may be the designation of a "Leader" mobile terminal, wherein messages to/from the designated leader mobile terminal may be prioritized as described below.

After each mobile terminal in the group has been synchronized and tracking parameters have been entered (acts 410 and 420) for example, mobile terminal 110 may begin to transmit and receive position messages (act 430). For example, using signals received from GPS satellites 150-170, mobile terminal 110 may calculate its location and transmit a position message to the other mobile terminals (120-130) within the group (act 430). Similarly, mobile terminals 120-130 may also calculate their respective locations and transmit their respective position messages to the other mobile terminals in the defined group. As will be described below, a position message transmitted between mobile terminals may have a determined priority based on a stored message priority level contained in group tracking memory 260.

Mobile terminal 110 may also calculate its position using the received signals from GPS satellites 150-170, and compare its position to tracking parameters stored in group tracking memory 260, for example. For example, mobile terminal 110 may determine that its position may have exceeded a tracking parameter. In response to a determination that mobile terminal 110 may have exceeded a tracking parameter, an alert message may be generated (act 430). For example, an alert message may indicate that one of mobile terminals is traveling too fast. Another alert message may indicate that one of mobile terminals is too far behind the group, heading in the wrong direction, or that one mobile terminal is not at an appropriate location at a designated time, for example.

Using network 140 for example, mobile terminals 110-130 may also transmit and receive text messages to one another (act 440). For example, using keys on keypad 310, a user of mobile terminal 110 may enter a text message to mobile terminal 120.

Using display 340, mobile terminal 110 may display position messages and text messages based on a priority level (act 450). For example, a group of mobile terminals (110-130) may receive and transmit position and text messages to one another, where all transmitted/received messages include a priority level associated with the message. A received message with the highest priority may be displayed, based on a message priority level stored in group tracking memory 260 as described below, for example.

Figure 5:
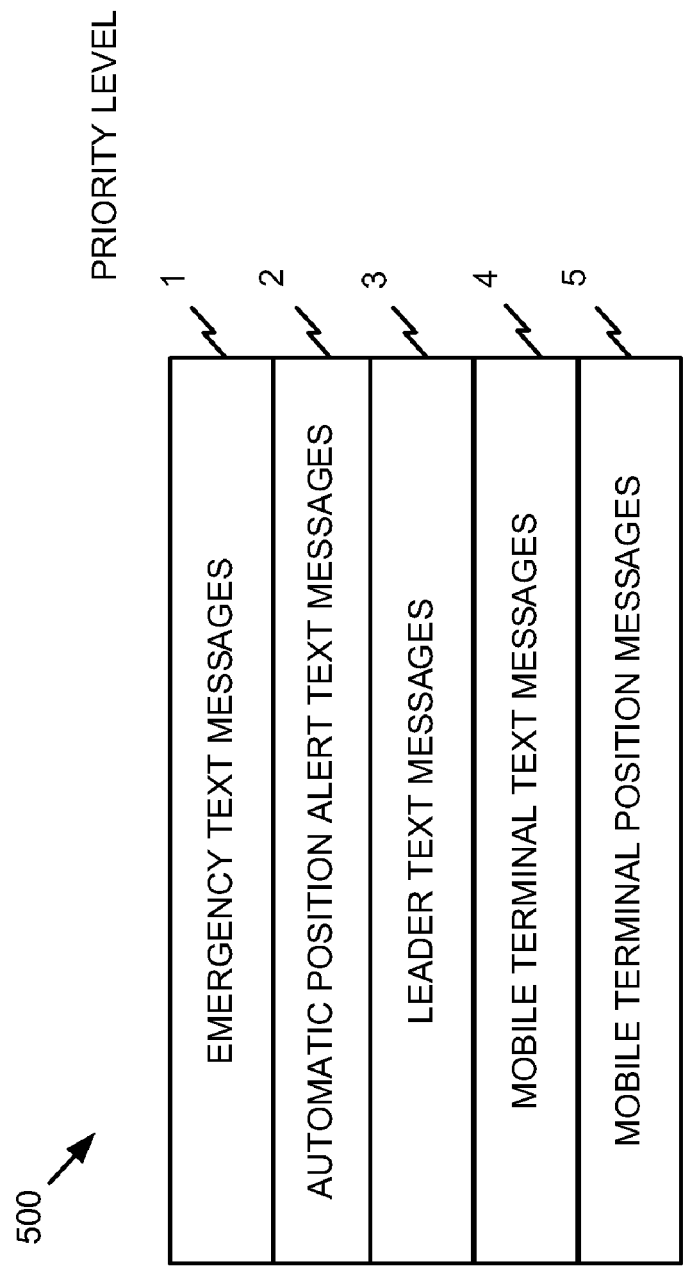
FIG. 5 is a diagram illustrating message level priorities.

FIG. 5 shows exemplary message priority levels that may be stored in group tracking memory 260. In this example, a highest priority message, level 1, may be an emergency message, such as a 911 type call from mobile terminal 110. For example, if a user of mobile terminal 110 uses keypad 310 to dial 911, a level 1 priority message such as "Help!" may be received and displayed by all other mobile terminals in the group. A level 2 priority message may be an automatically generated position alert text message. An automatically generated position alert text message (level 2 priority message) may be generated based on comparing the position, velocity and/or acceleration of a mobile terminal to the stored tracking parameters in group tracking memory 260, for example. For example, mobile terminal 110 may get too far away from, or too close to, another mobile terminal and may generate a level 2 position alert message. A position alert message (level 2) may also be generated in response to a mobile terminal traveling too quickly, for example. A level 3 priority message may be a text message from a designated leader mobile terminal. A level 4 priority message may be a text message from one mobile terminal to another mobile terminal in the group. A level 5 priority message may be position messages transmitted to/from other mobile terminals in the group. It should be understood that there may be any number of priority levels and that the categories of priority levels may vary as desired.

Using these exemplary message prioritization levels as shown in FIG. 5, processing logic 210 and group tracking memory 260 may be used to control display 340 to display a received message with the highest priority (act 450). For example, a received message with the highest priority level may be displayed before a message(s) of lower priority.

For example, mobile terminal 110 may display the position of all mobile terminals in the group as shown in FIG. 3, for example. If for example, mobile terminal 110 (party #4) falls too far behind the leader mobile terminal, based on comparing it's calculated position to a stored tracking parameter, an automatic position alert message may be generated and displayed on mobile terminal 110 (party #4) as shown in FIG. 6A. In this example, the displayed message "Party # 4 Please Speed Up!" may be a level 2 priority message. This exemplary priority level 2 message may take priority over displaying level 5 priority messages relating to the position of the mobile terminals in the group (as shown in FIG. 3). In this manner, the user of mobile terminal 110 (party #4) is given alerting information relating to their location relative to the leader mobile terminal. The position alert message may also include additional information. For example, the position alert message may include a distance parameter indicating how far mobile terminal 110 is behind. For example, the position alert message may indicate that mobile terminal 110 is 300 meters behind the group of other mobile terminals. In addition the message may include name information, which may be the name of the party of mobile terminal 110, as opposed to the designation "party # 4."

Figure 6B:
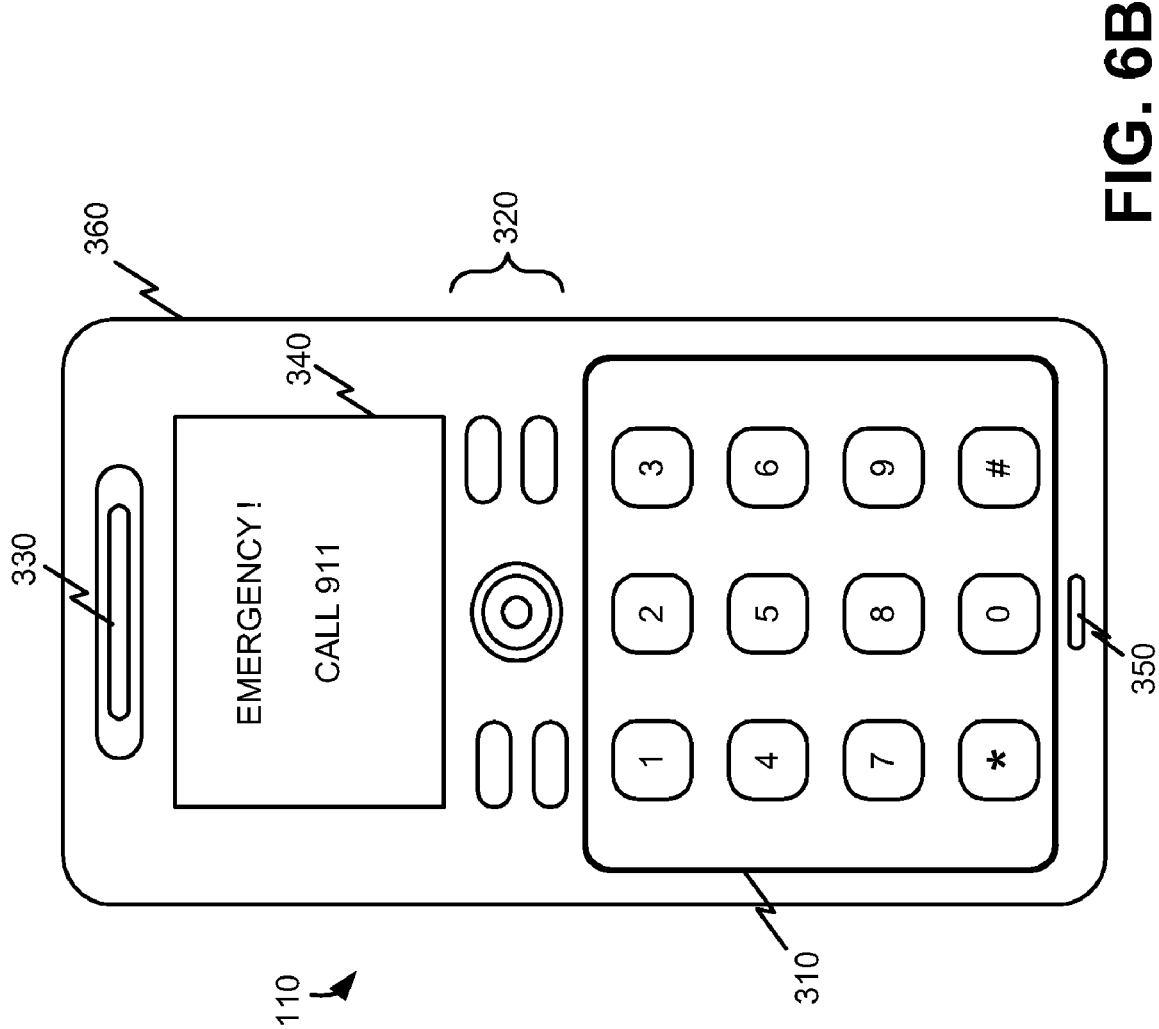

If for example, mobile terminal 120 may be receiving a text message from mobile terminal 130 (level 4 priority), and an emergency message is transmitted from mobile terminal 110, this level 1 priority message may be displayed via display 340, as shown in FIG. 6B. For example, the user of mobile terminal 110 may have been injured hiking with the group, and may dial 911 for a medical emergency. In this example, the level 4 priority message (text message from mobile terminal 130 to mobile terminal 120) may not be displayed on mobile terminal 120, until after the level 1 priority emergency message "Emergency! Call 911" may be displayed. In this exemplary embodiment, all mobile terminals in the defined group may receive and display the emergency message (acts 440 and 450). For example, processing logic 210 may attach a level 1 priority to any text message entered by user of mobile terminal 110, that may include any of the words "help," "emergency," or "911." Processing logic 210 may also attach a level 1 priority to a message if for example a user of mobile terminal dials 911. For example, group tracking memory 260 may store information that includes instructions to transmit all level 1 priority messages to all other mobile terminals in the group. Level 1 priority messages may then be received and displayed by all mobile terminals in the group, for example.

Figure 6C:
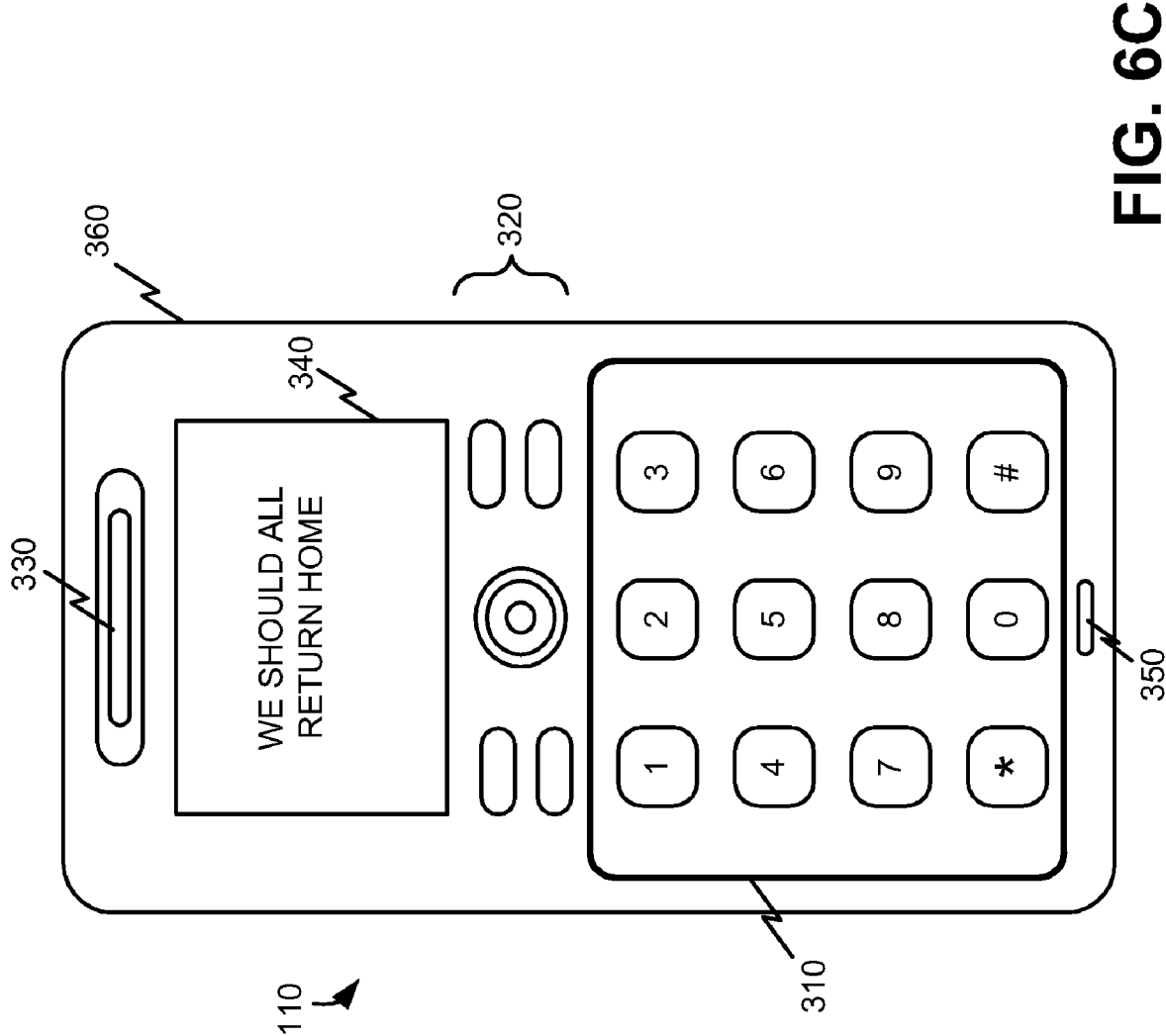

Another exemplary message is shown in FIG. 6C. In this example, a message from the designated leader mobile terminal "We Should All Return Home" may be transmitted to each mobile terminal in the group and displayed (acts 440 and 450). In this example, a message from the leader mobile terminal is a level 3 priority message, and may be displayed before a level 4 priority or a level 5 priority message, for example (act 450). In other embodiments, the leader mobile terminal may send a level 3 message that transfers the lead to another mobile terminal in the group, for example.

Figure 6D:
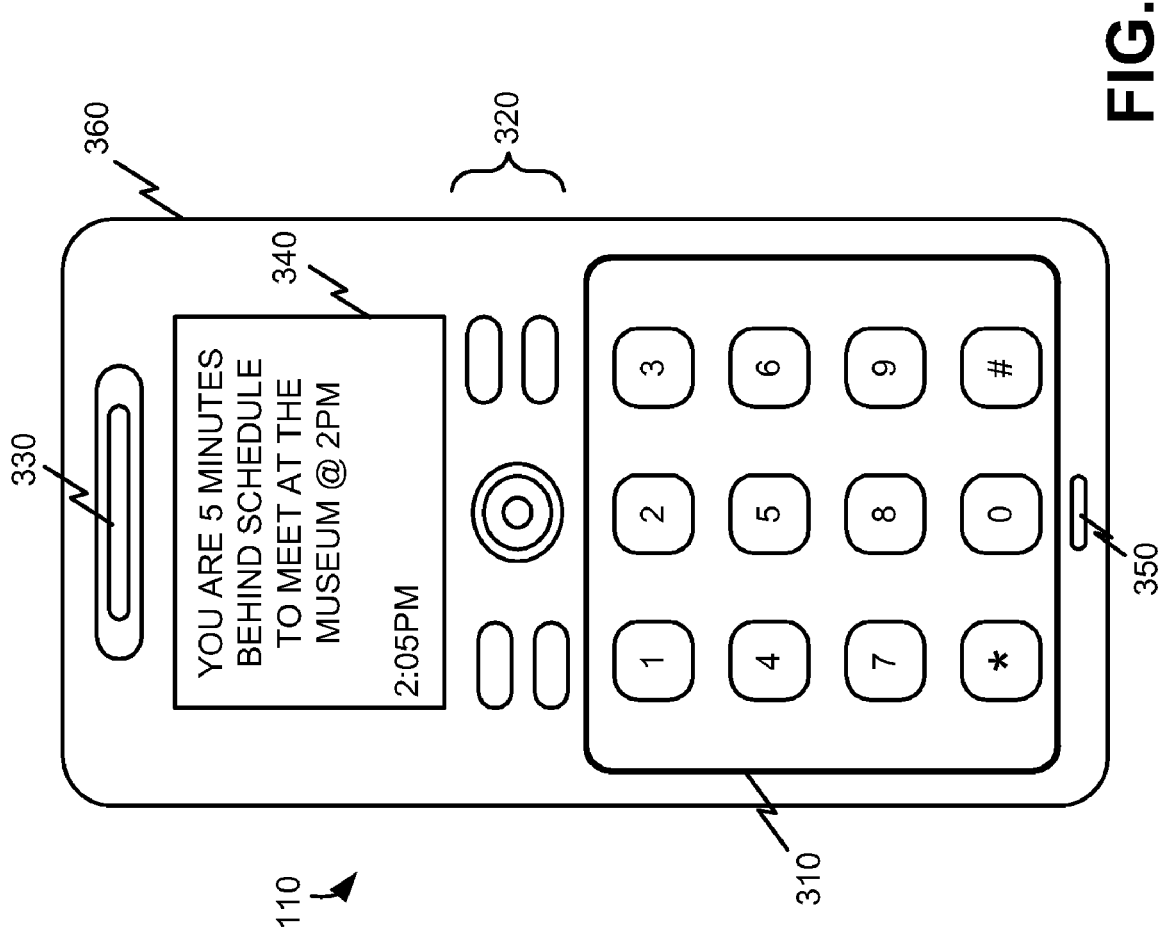

A further exemplary message is shown in FIG. 6D. In this example, a message "You are 5 minutes behind schedule to meet at the museum at (2 PM" may be displayed on mobile terminal 110. In this example, a user of mobile terminal 110 may have entered tracking parameters relating to a field trip in Washington D.C., for example, information relating to meeting at a specific location (the museum) at a specific time (2 PM). In this example, a position alert message (level 2 priority) may be automatically generated (act 430) and displayed (act 450) by mobile terminal 110, based on comparing the time and position of mobile terminal 110 to the stored tracking parameters. In this example, it may be 2:05 PM, and the position of mobile terminal 110 may be determined not to be at the location of the museum. In response to this determination, the exemplary message shown in FIG. 6D may be displayed. On the contrary, if the location of mobile terminal 110 is determined to be at the museum at 2 PM, no position alert message may be generated, for example. In further embodiments, a level 2 position alert message may also be transmitted to and displayed on the leader mobile terminal, in response to mobile terminal 110 being off track based on comparing the location of mobile terminal 110 to the tracking parameters stored in group tracking memory 260. For example, if mobile terminal 110 has been identified as "Party # 5," a text message "Party # 5 is not here," may be displayed on leader mobile terminal. Leader mobile terminal may then desire to send a text message (level 3 priority) to party # 5, for example, inquiring as to the reason "Party # 5" may not be at the scheduled location.

If mobile terminal 110 is not currently receiving any messages with priority levels 1-4, a display of position messages may be displayed as shown in FIG. 3, for example. The display of the positions of mobile terminals (level 5) may be considered as a default display that may be changed when higher priority messages (levels 1-4) may be received. In this manner, when a message (text or position) may be received by mobile terminal 110, the priority of the message may be determined. Therefore, messages with the highest priority and importance for tracking a group of mobile terminals may be displayed.

CONCLUSION

Implementations consistent with the systems and methods described herein allow users of a mobile terminal to transmit and receive prioritized messages. These messages may be related to the position of one mobile terminal relative to other mobile terminals in a group. This greatly enhances the capabilities of mobile terminals.

The foregoing description of the embodiments provides illustration and description, but is not intended to be exhaustive or to limit implementations to the precise form disclosed. Modifications and variations are possible in light of the above teachings or may be acquired from practice of the implementations.

For example, the embodiments have been described in the context of a mobile terminals communicating over a network and employing GPS features. The embodiments may be implemented in other devices or systems and/or networks.

Further, while series of acts have been described with respect to FIG. 4, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:

forming, using a plurality of mobile terminals, a group including the plurality of mobile terminals, where the group travels together, and where forming the group includes:
  synchronizing the plurality of mobile terminals, and
  setting at least one tracking parameter shared by each of said plurality of mobile terminals, where the at least one tracking parameter comprises designating a leader mobile terminal; and for one of said plurality of mobile terminals:
  determining first position information regarding the one of said plurality of mobile terminals,
  transmitting the first position information to the other ones of the plurality of mobile terminals,
  receiving second position information from the other ones of the plurality of mobile terminals,
  automatically forming an alert message based on the at least one tracking parameter, the first position information, and the second position information, where the at least one tracking parameter includes a distance from the leader mobile terminal and the alert message comprises a distance alert to indicate that one or more of said plurality of mobile terminals is farther from the leader mobile terminal than said distance,
  where the tracking parameter further includes a group itinerary defining a plurality of destinations for the plurality of mobile terminals and a time associated with each of the destinations, and the alert message indicates that one of the plurality of mobile terminals is not at one of the plurality of destinations at the time associated with the one of the plurality of destinations,
  automatically providing, to a user, said first position information, said second position information, and said formed alert message, including:
    providing a graphical depiction of the first position information and the second position information, where the graphical depiction specifically identifies the leader mobile terminal and others of the plurality of mobile terminals, and
    interrupting the providing of the graphical depiction to provide the alert message,
  receiving a message from said other ones of the plurality of mobile terminals, where said message comprises one of an emergency message, a leader message from the leader mobile terminal, or a text message, and
  automatically providing the message to the user, where:
    said emergency message is provided before providing said alert message,
    said alert message is provided before providing said leader message,
    said leader message is provided before providing said text message, and
    said text message is provided before providing said first position information and said second position information.

2. The method of claim 1, where
the at least one tracking parameter includes an area,
the plurality of mobile terminals comprises a first mobile terminal, and
the alert message comprises an indication of whether the first mobile terminal is in the area.

3. The method of claim 1, where the alert message comprises a speed alert to indicate that one of the plurality of mobile terminals is not moving at a particular velocity substantially shared by others of the plurality of mobile terminals.

4. The method of claim 1, where the alert message comprises text indicating an acceleration alert to indicate that one of the plurality of mobile terminals is not moving at a particular acceleration substantially shared by others of the plurality of mobile terminals.

5. The method of claim 1, where the alert message comprises text indicating a heading alert to indicate that one of the plurality of mobile terminals is not moving in a particular direction substantially shared by others of the plurality of mobile terminals.

6. A plurality of mobile terminals forming a group that travels together, one of the plurality of mobile terminals comprising:
   a memory to store tracking information shared by each of the plurality of mobile terminals, where the tracking information comprises data associated with designating a leader mobile terminal;
   a display; and
   a processor to:
      control the display to display a position of each of the plurality of mobile terminals, where the display identifies the leader mobile terminal and others of the plurality of mobile terminals,
      compare the positions of the plurality of mobile terminals to the stored tracking information, where the at least one tracking parameter includes a distance from the leader mobile terminal,
      control the display to interrupt displaying the position of each of the plurality of mobile terminals to display position alert messages relating to the positions of the plurality of mobile terminals based on the comparing of the positions of the plurality of mobile terminals to the stored tracking information, where the alert messages comprise a distance alert to indicate that one or more of the plurality of mobile terminals is farther from the leader mobile terminal than said distance,
      where the tracking parameter further includes a group itinerary defining a plurality of destinations for the plurality of mobile terminals and a time associated with each of the destinations, and the position alert messages indicate that one of the plurality of mobile terminals is not at one of the plurality of destinations at the time associated with the one of the plurality of destinations,
      receive a message from another of the plurality of mobile terminals, where the message comprises one of an emergency message, a leader message from the leader mobile terminal, or a text message, and
      control the display to display the message, where
         said emergency message is displayed before displaying said position alert messages,
         said position alert messages are displayed before displaying the leader message,
         said leader message is displayed before displaying said text message, and
         said text message is displayed before displaying the display of the position of each of the plurality of mobile terminals.

7. The mobile terminal of claim 6, where
the tracking information includes an area,
the plurality of mobile terminals comprises a first mobile terminal, and
the position alert messages indicate whether the first mobile terminal is in the area.

8. The mobile terminal of claim 6, where the position alert messages comprise text indicating a speed alert to indicate that one of the plurality of mobile terminals is not moving at a particular velocity substantially shared by others of the plurality of mobile terminals.

9. The mobile terminal of claim 6, where the position alert messages comprise text indicating a heading alert to indicate that one of the plurality of mobile terminals is not moving in a particular direction substantially shared by others of the plurality of mobile terminals.

10. The mobile terminal of claim 6, where the plurality of mobile terminals communicates via a cellular communications network.

* * * * *